United States Patent
Sengupta et al.

(10) Patent No.: US 10,721,684 B2
(45) Date of Patent: Jul. 21, 2020

(54) ELECTRONIC DEVICE HAVING TWO PROCESSORS TO PROCESS DATA

(71) Applicant: INTEL CORPORATION, Santa Clara, CA (US)

(72) Inventors: Uttam K. Sengupta, Portland, OR (US); Ke Ding, Shanghai (CN); Yuhuan Christina Huang, Shanghai (CN); Jun Feng Lu, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 343 days.

(21) Appl. No.: 15/037,103

(22) PCT Filed: Dec. 27, 2013

(86) PCT No.: PCT/CN2013/090701
§ 371 (c)(1),
(2) Date: May 17, 2016

(87) PCT Pub. No.: WO2015/096135
PCT Pub. Date: Jul. 2, 2015

(65) Prior Publication Data
US 2016/0295507 A1 Oct. 6, 2016

(51) Int. Cl.
*H04W 52/02* (2009.01)
*H04W 4/80* (2018.01)
(Continued)

(52) U.S. Cl.
CPC ...... *H04W 52/0209* (2013.01); *G06F 1/3293* (2013.01); *H04L 45/22* (2013.01);
(Continued)

(58) Field of Classification Search
None
See application file for complete search history.

(56) References Cited

U.S. PATENT DOCUMENTS 6,711,643 B2    5/2004  Park et al.
7,245,725 B1 *  7/2007  Beard ............... G06F 1/3203
                                                    380/270

(Continued)

FOREIGN PATENT DOCUMENTS

CN  102985908   3/2013
CN  103400086   11/2013
(Continued)

OTHER PUBLICATIONS

Office Action dated Sep. 28, 2018 for Korean Patent Application No. 10-2016-7014250, 4 pages.
(Continued)

*Primary Examiner* — Mohammed Rachedine
(74) *Attorney, Agent, or Firm* — Schwabe, Williamson & Wyatt, P.C.

(57) ABSTRACT

An electronic device may be provided that includes a first processor and a second processor, the first processor to wirelessly receive a data packet from another device, and to determine a property (or type) of the received data packet. When the property or type of the received data packet is a first property or first type then the first processor to process the data packet. On the other hand, when the property or type of the received data packet is a second property or second type then the second processor to process the data packet.

13 Claims, 5 Drawing Sheets

(51) Int. Cl.
  *H04L 12/707* (2013.01)
  *H04L 29/06* (2006.01)
  *G06F 1/3293* (2019.01)
  *G06F 1/3206* (2019.01)

(52) U.S. Cl.
  CPC .............. *H04L 69/22* (2013.01); *H04W 4/80* (2018.02); *H04W 52/0293* (2013.01); *Y02D 10/122* (2018.01); *Y02D 70/144* (2018.01); *Y02D 70/26* (2018.01)

(56) References Cited

U.S. PATENT DOCUMENTS

| | | | |
|---|---|---|---|
| 7,765,405 B2* | 7/2010 | Pinkerton | H04L 9/3236 |
| | | | 713/181 |
| 7,940,355 B2 | 5/2011 | Sakarazawa et al. | |
| 8,019,370 B2 | 9/2011 | Sengupta et al. | |
| 8,077,157 B2 | 12/2011 | Sengupta et al. | |
| 8,085,190 B2 | 12/2011 | Sengupta et al. | |
| 8,224,402 B2 | 7/2012 | Sengupta et al. | |
| 8,316,247 B2 | 11/2012 | Theocharous et al. | |
| 2007/0079161 A1 | 4/2007 | Gupta | |
| 2008/0244005 A1 | 10/2008 | Sengupta et al. | |
| 2009/0033786 A1* | 2/2009 | Finkelstein | G02B 7/285 |
| | | | 348/345 |
| 2011/0019600 A1 | 1/2011 | Ping et al. | |
| 2011/0289519 A1 | 11/2011 | Frost | |
| 2012/0331088 A1* | 12/2012 | O'Hare | G06F 21/6227 |
| | | | 709/214 |
| 2013/0332720 A1* | 12/2013 | Gupta | G06F 9/44 |
| | | | 713/100 |
| 2014/0090047 A1 | 3/2014 | Yuan et al. | |
| 2014/0119256 A1* | 5/2014 | Kim | H04W 52/0209 |
| | | | 370/311 |

FOREIGN PATENT DOCUMENTS

| | | |
|---|---|---|
| EP | 2713662 A2 | 4/2014 |
| KR | 20060090707 A | 8/2006 |
| KR | 20110020919 A | 3/2011 |
| WO | WO2012163428 A1 | 12/2012 |

OTHER PUBLICATIONS

International Search Report, Written Opinion and International Preliminary Report issued in PCT/CN2013/090701 dated Jun. 28, 2016.
Office Action dated Oct. 2, 2018 for European Patent Application No. 13899999.0, 6 pages.
Search Report dated Jul. 10, 2017 for European Patent Application No. 13899999.0, 9 pages.

* cited by examiner

ELECTRONIC DEVICE HAVING TWO PROCESSORS TO PROCESS DATA

CROSS-REFERENCE TO RELATED PATENT APPLICATIONS

This application is a U.S. National Stage Application under 35 U.S.C. § 371 of PCT Application No. PCT/PCT/CN2013/090701, filed Dec. 27, 2013, whose entire disclosure is hereby incorporated by reference.

BACKGROUND

1. Field

Embodiments may relate to circuitry or logic to process data packets at a specific processor.

2. Background

A wearable device (or wearable sensing device) for health and wellness purposes may have a limited battery life based on processing and data buffering performed on the wearable device and based on form factor constraints, such as limited space and weight for larger batteries. A wearable device may have a battery life of 1-4 days, for example. Accordingly, sensor data may be offloaded from the wearable device to another electronic device, such as a smartphone. This may be done by continuously transferring data from the wearable device to the electronic device. However, this may decrease the battery life of the electronic device, such as battery life of the smartphone.

BRIEF DESCRIPTION OF THE DRAWINGS

Arrangements and embodiments may be described in detail with reference to the following drawings in which like reference numerals refer to like elements and wherein.

DETAILED DESCRIPTION

In the following detailed description, like numerals and characters may be used to designate identical, corresponding and/or similar components in differing figure drawings. Further, in the detailed description to follow, example sizes/models/values/ranges may be provided although embodiments are not limited to the same. Where specific details are set forth in order to describe example embodiments, it should be apparent to one skilled in the art that embodiments may be practiced without these specific details.

Embodiments may relate to an electronic device that includes a first processor (such as services processing logic) and a second processor (such as a host processor). The first processor may process information coming from the low energy (LE) wearable devices. The second processor may handle data coming from non-LE, standard, legacy or classic peripheral devices. The electronic device may use a low power (or energy) radio protocol in order to communicate with another device, such as a wearable device. For ease of discussion, the following description may relate to use of Bluetooth™ (BT) communication. However, other communication protocols should also be used.

The host processor may handle all traditional profiles that are used with applications that operate in a foreground in an interactive mode. The first processor (or services processing logic)(or another low power, always-on IP block) may handle only LE related profiles and applications that need to operate in the background, continuously transferring data from the wearable device to the electronic device (or smartphone) and processing the transferred data autonomously without waking up the host processor. The first processor (or services processing logic) may be coupled to a dual mode BT module.

Embodiments may include the first processor's firmware (FW) to evaluate BT data packets to determine if the packets are related to LE profile or related to the classic profile, and the first processor may handle the data packets either in the first processor or pass the data packet(s) through to the host processor.

Embodiments may include services processing logic (or first processor) and a host processor (or second processor). A data packet (such as sensor data) may be wirelessly received at an electronic device (that has the integrated service hub and the host processor). The data packet may include a header that contains information to identify a type of device (such as a LE profile device or a classic/standard profile device). The services processing logic may determine the type of device that sent the data packet based on analysis of the header data (and also payload, if necessary). When the services processing logic determines that the received data packet relates to a LE type of device, then the services processing logic may process the data (and run the application corresponding to the LE type of device). On the other hand, when the services processing logic determines that that received data packet relates to a classic/standard profile device, then the services processing logic may forward the data packet to the host processor. The host processor may then process the data (and run the application corresponding to the classic/standard profile device).

The services processing logic (SPL) may also be called services control logic, control logic for services and/or control logic. This may be a services I/O processing logic that while capable of performing many processor functions, it may be one with a specific purpose. The services processing logic may be a processor other than a general purpose processor. As another example, the services processing logic may be a graphics processor/accelerator that is farming out processing cycles when idle. The services processing logic may be a low power processor that does not require fast computer cycles and in return supplies cycles at low power.

Figure 1:
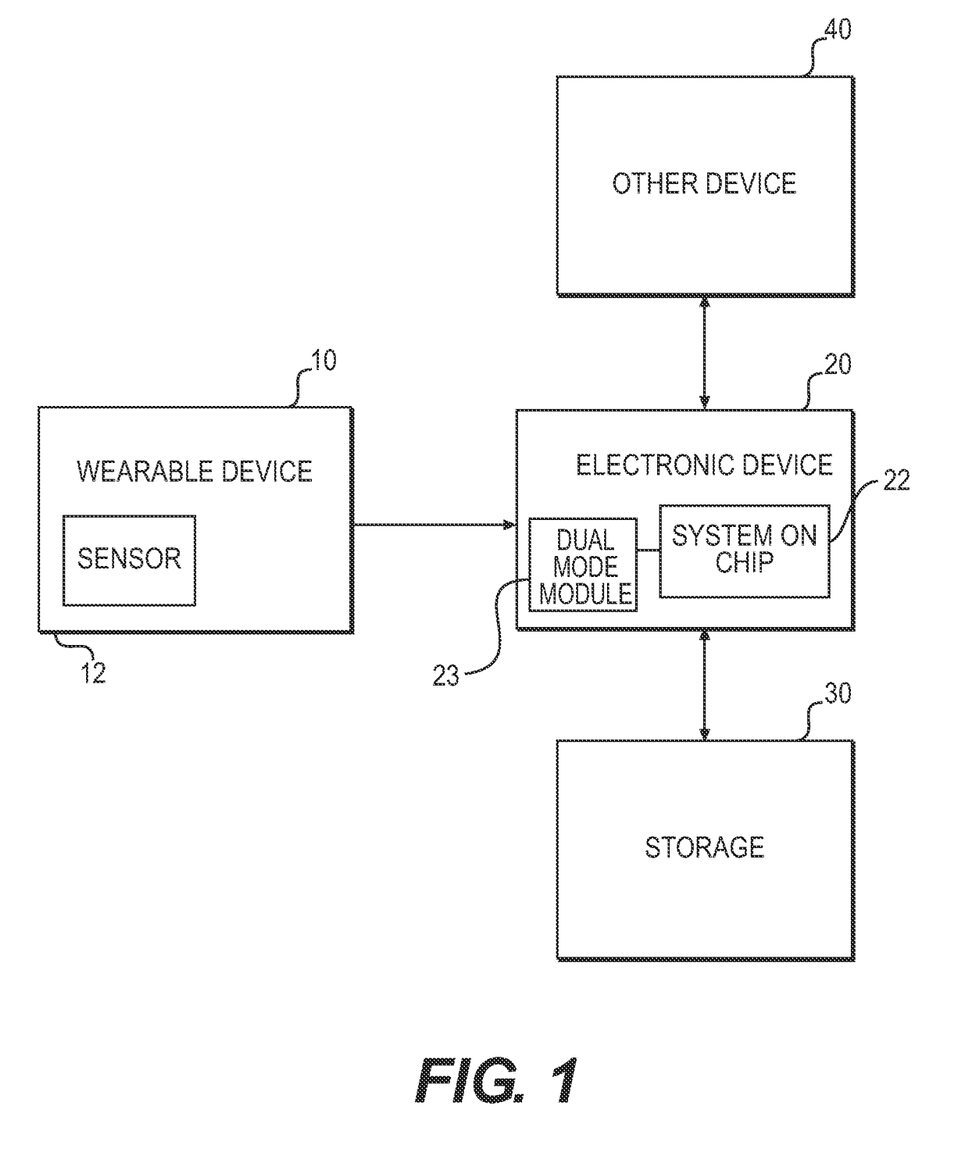
FIG. 1 shows interactions between different devices according to an example arrangement.

FIG. 1 shows interactions between different devices according to an example arrangement. Other interactions and arrangements may also be provided.

More specifically, FIG. 1 shows a wearable device 10, an electronic device 20, a storage 30 and other devices 40.

The wearable device 10 may be an electronic device that may be worn by a user. The wearable device 10 may communicate with the electronic device 20 using a low power communication radio protocol, such as Bluetooth™ (BT). Other radio protocols may also be used. The wearable device 10 may include a sensor 12 to sense data, such as heart beat, movement, location, etc. The wearable device 10 may communicate sensor data to the electronic device 20.

The wearable device 10 may be considered a first type of device or may be considered a second type of device. For example, the first type of device may be called a low energy (LE) device (having a LE profile such as a proximity key fob, a bike speed sensor, a pedometer, etc.), and the second type of device may be called a classic device (having a classic profile such as BT headsets, BT stereo speakers). As one example, the classic device (having a classic profile) may be a headset, a hands-free device, etc. As one example, the LE device (having the LE profile) may relate to proximity, heart-rate, etc. The LE devices may have a shorter operating range, consume much less power and may be targeted for continuous data gathering operations.

The electronic device 20 may be any one of a mobile terminal, a mobile device, a mobile computing platform, a mobile platform, a laptop computer, a tablet, an ultra-mobile personal computer, a mobile Internet device, a smartphone, a personal digital assistant, a display device, a television (TV), etc. For ease of discussion, the following may relate to the electronic device being a smartphone.

In at least one example arrangement, the electronic device 20 may include a system on chip 22, a battery, a wireless communication device, a display, etc. The electronic device 20 may also include a dual mode module 21. As one example, the dual mode module may be a dual mode BT module.

The storage 30 may be any type of device or system to store data. For example, the storage 30 may be a server, a memory device, a cloud device, cloud services (i.e., archives data and performs analytics on data for additional inferences), etc. The storage 30 may store data received from the electronic device 20 and/or perform additional processing.

The other device 40 may be another electronic device, such as an electronic device to be used by another user or may be a second wearable device (such as the user having a BT headset as well as a BT LE wristband pedometer). The electronic device 20 may communicate back and forth with the other device 40.

The wearable device 10 may communicate with the electronic device 20, such as a smartphone, over a low power wireless network. For example, the low power wireless network may include Bluetooth Low Energy (BLE) devices and/or other low power wireless devices.

The electronic device 20 may receive data from the wearable device 10. The received data may be sensor data, for example. The electronic device 20 may then process the data received from the wearable device 10. However, the technique to process the received data may be dependent on the type of the wearable device (and more specifically based on the type of profile of the wearable device).

The data received at the electronic device 20 may be data packets having a header. As one example, the data packets may be Bluetooth (BT) data packets containing sensor data from the wearable device 10. Other types of data packets and/or other radio protocols may also be provided.

In at least one arrangement, the electronic device 20 may include a dual mode module to be used for both the classic profile and the LE profile. The dual mode module may be a dual mode Bluetooth (BT) module, for example. Other types of dual mode modules may also be provided. In at least one embodiment, two separate software (SW stacks) may be provided, namely a classic SW stack containing classic profiles for use by a host processor and a LE SW stack for use by a low power services processing logic. In another embodiment, the dual BT capabilities may be integrated in silicon with the remainder of the SOC IP blocks.

Figure 2:
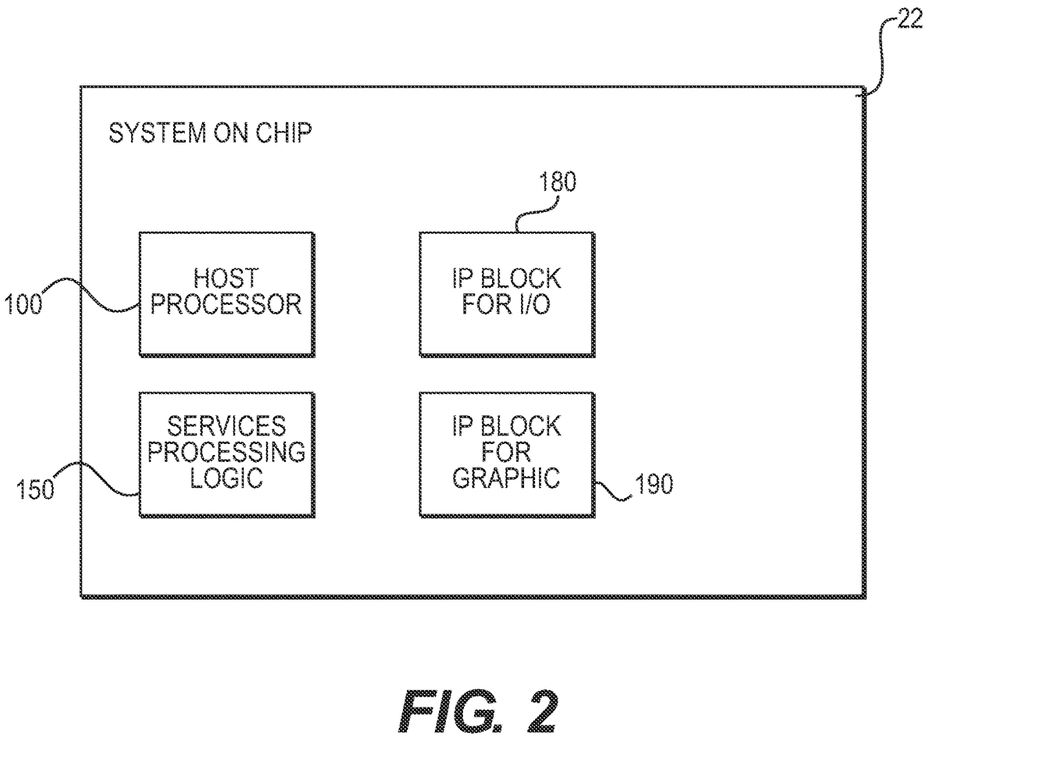
FIG. 2 shows a system on chip according to an example arrangement.

FIG. 2 shows a system on chip (SOC) according to an example arrangement. Other arrangements may also be provided. FIG. 2 shows the system on chip 22 as a component of the electronic device 20.

The system on chip (SOC) 22 may include a silicon chip, and may include a plurality of intellectual property (IP) blocks provided on the silicon chip. The SOC 22 may be an integrated circuit (IC) that integrates components of the electronic system into a single silicon chip. The SOC may contain digital, analog, mixed-signal, and radio-frequency functions. The SOC may include both hardware (processors, controllers, memory, voltage regulators, etc.), and software for controlling the hardware.

As one example and for ease of description, FIG. 2 shows the SOC 22 including a host processor 100 (or second processor), a services processing logic (SPL) 150 (or first processor), an IP Block for Input/Output (I/O) 180 and an IP Block for Graphics 190. Other IP blocks may be used such as IP blocks for audio, imaging, video, etc. The IP blocks on the SOC may be based on usage and the device targeted.

Other blocks may also be provided on the SOC 22 (of the electronic device 20).

The services processing logic (SPL) 150 may also be referred to as a first processor, and the host processor 100 may be referred to as a second processor. Other names or terminologies may also be provided.

Embodiments may provide (or offload) portions of a software (SW) stack (e.g., a BT SW stack) to the services processing logic 150 while providing portions of a SW stack to the host processor 100. The partitioning of the SW stack between the host processor 100 and the services processing logic 150 may enable electronic devices to support continuous sensing from the wearable devices 10 while limiting the impact of battery life on both the wearable device 10 and the electronic device 20.

Figure 3:
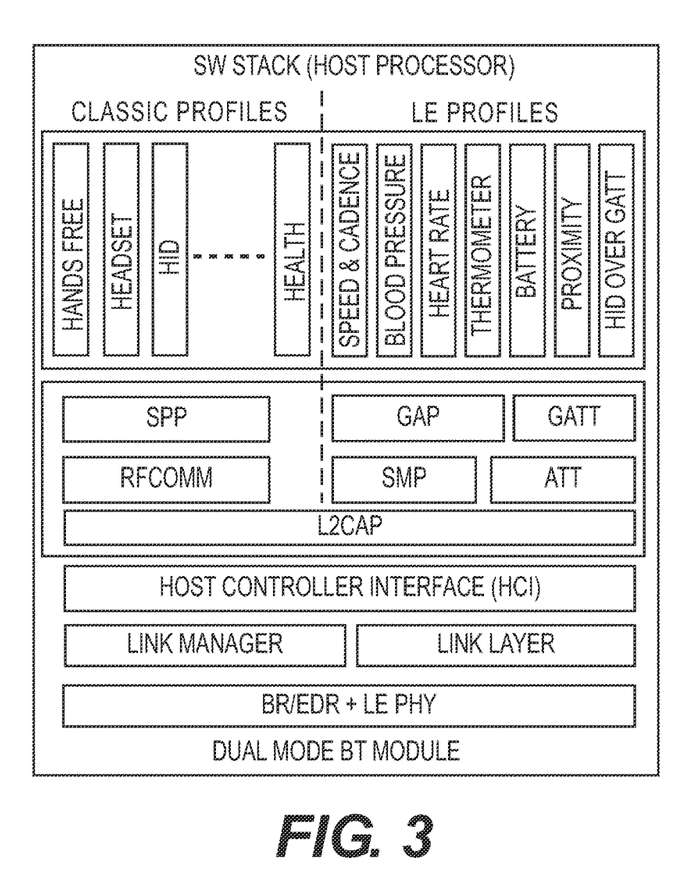
FIG. 3 shows a software stack on a host processor according to an example arrangement.

FIG. 3 shows a software (SW) stack on a host processor according to an example arrangement. In this arrangement, the full BT SW stack (classic and LE) may be run on the main host processor. In this example, all the profiles may be handled by the host processor. The software stack may represent applications that may be executed by the host processor on the electronic device.

More specifically, FIG. 3 shows a software (SW) stack that may be provided at a host processor of an electronic device.

As shown in FIG. 3, the software stack may include applications corresponding to classic profiles and applications corresponding to LE profiles. Bluetooth profiles may be a set of specifications that define how wireless transmission may work between devices for different user tasks.

The software stack may also include other components as shown in FIG. 3. Other components and applications may also be provided.

FIG. 3 shows a monolithic SW stack that is large and complex since the SW stack includes both classic profiles and LE profiles. During operation, the SW may load all the profiles (in the classic profiles and the LE profiles) to the host processor regardless of whether the profiles are to be used or not.

Software of the SW stack of FIG. 3 may run entirely on the host processor (of the electronic device). However, the always-on usages with the LE profiles may impact a life of a battery.

Figure 4:
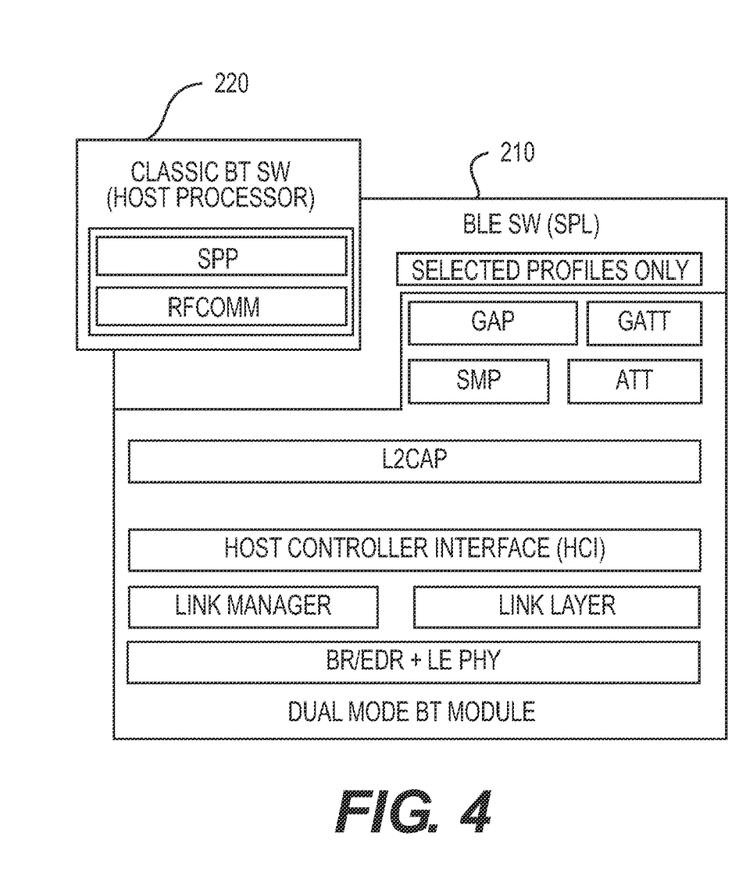
FIG. 4 shows two separated software stacks of an electronic device according to an example embodiment.

FIG. 4 shows two software stacks of an electronic device according to an example embodiment. In this embodiment, the BT stack may be split into two with the foundation components and the BT LE related profiles being hosted on the services processing logic while the classic components are separated and run on the host processor (e.g. Intel Atom or core processors). Other embodiments and configurations may also be provided. The software stacks may represent applications that may be executed on the electronic device.

FIG. 4 shows two software (SW) stacks, namely a first SW stack 210 and a second SW stack 220. The first SW stack 220 may represent software to be provided at the services processing logic 150. The second SW stack 210 may represent software to be provided at the host processor 100 of the electronic device.

The SW stacks 210 and 220 may provide a reduced SW footprint for each processor (as compared to full SW stack of FIG. 3). The SW stack may be optimized and unnecessary code may be removed. For example, the LE profiles in the SW stack 210 may be only the LE profiles needed for enabling always-on usages required to support the wearable devices.

Figure 5:
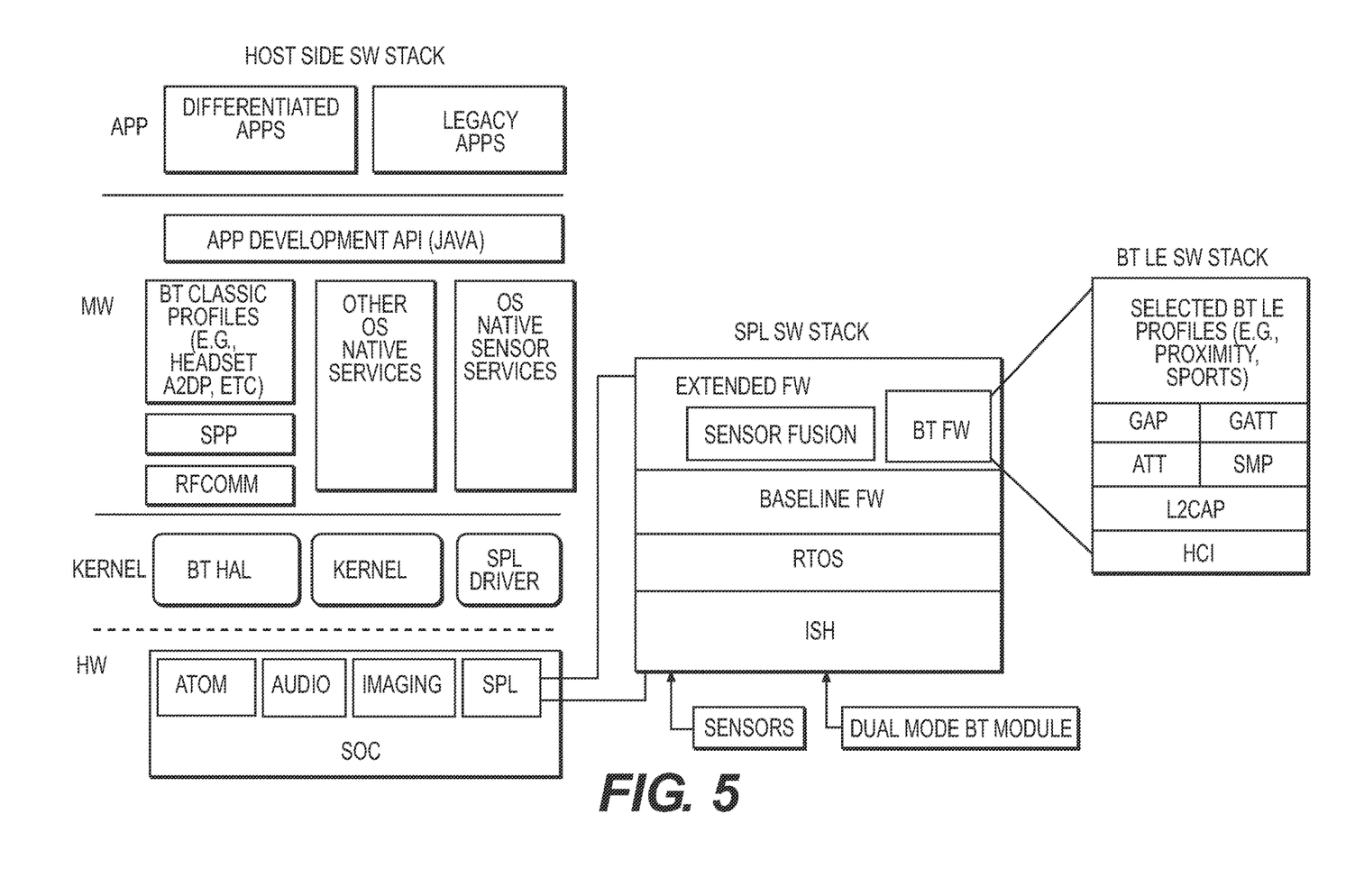
FIG. 5 shows a first software stack and a second (or host side) software stack according to an example embodiment.

FIG. 5 shows a services processing logic (SPL) SW stack and a host side SW stack according to an example embodiment. Other embodiments and configurations may also be provided. FIG. 5 shows that a dual mode BT module and sensors may be connected to the services processing logic SW stack. FIG. 5 also shows that a BT LE SW stack may be used by a BT firmware (FW).

As shown in FIG. 5, the BT LE SW stack may relate to selected BT LE profiles, and the host side SW stack may relate to BT classic profiles.

Figure 6:
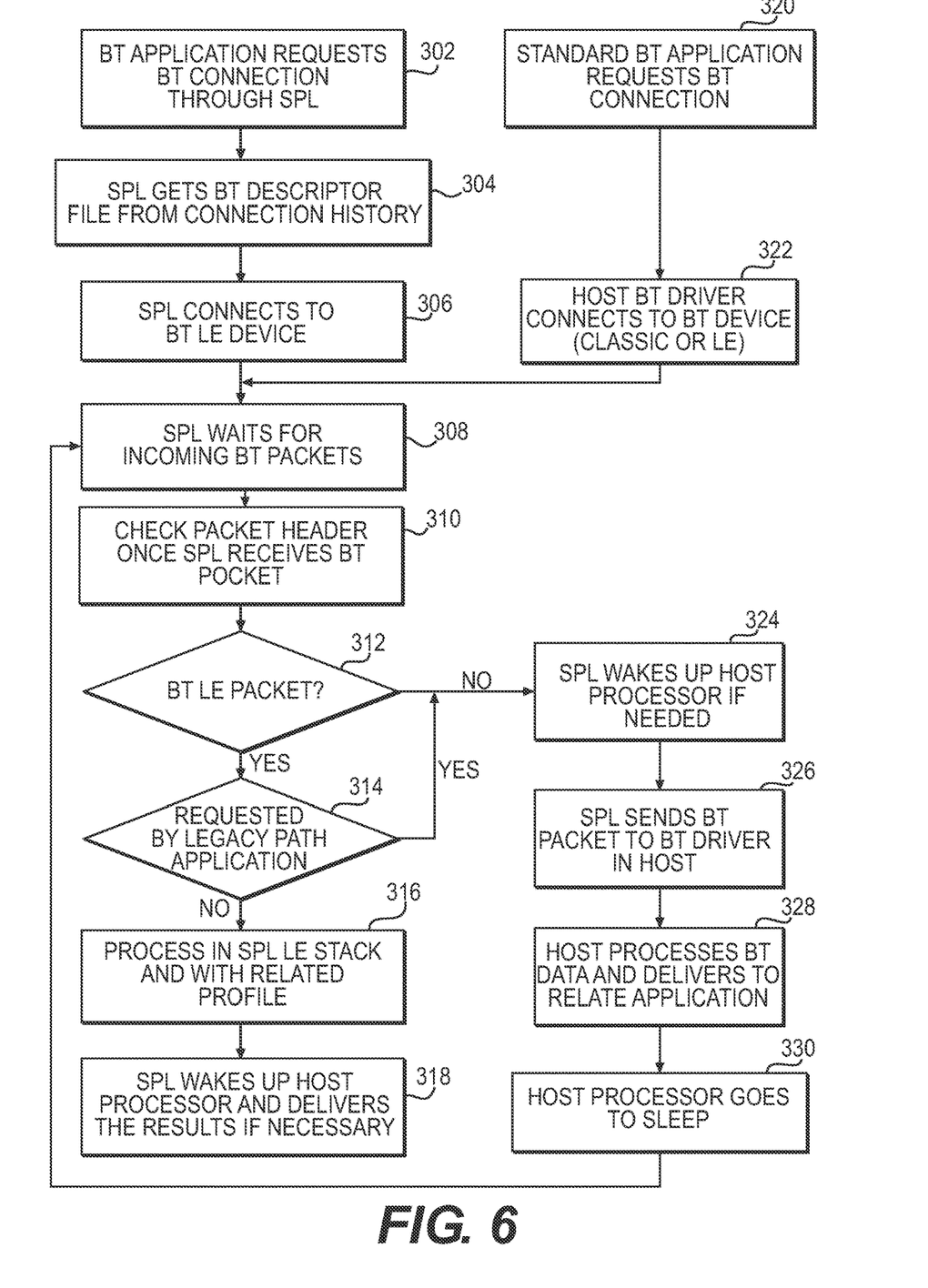
FIG. 6 is a flowchart showing operations according to an example embodiment.

FIG. 6 is a flowchart showing operations according to an example embodiment. Other operations, orders of operations and embodiments may also be provided. While the following flowchart may relate to Bluetooth operations, other radio protocols may also be used. Bluetooth operations are merely one example embodiment, and is not limiting of other examples.

More specifically, FIG. 6 shows operations that may be performed by components of the electronic device 20. The operations may be performed by the services processing logic (SPL) 150 and/or by the host processor 100.

The various operations may be performed by logic, circuitry or other hardware on the electronic device. For example, the operations may be performed by logic, circuitry or other hardware corresponding to the host processor and/or the services processing logic.

The flowchart may relate to operations performed when the electronic device 20 receives a data packet or data packets from the wearable device 10. For ease of discussion, the operations discussed below may relate to BT data packets that contain sensor data.

In operation 302, a low power BT application may request a low power connection (e.g. a BT connection) through the services processing logic.

In operation 304, the services processing logic (SPL) may receive a BT descriptor file from a connection history stored in a memory, for example. In operation 306, the services processing logic may provide a connection to the wearable device (such as a BT LE device) by using a wireless connection.

In another example, in operation 320, a standard BT application may request the low power connection (e.g. a BT connection). In operation 322, a host BT driver may connect to the wearable device (such as a BT device).

In operation 308, the services processing logic (SPL) may wait for an incoming BT data packet from the wearable device.

In operation 310, the services processing logic may check or examine (or monitor) a packet header (such as HCl and L2CAP packet headers) of the data packet once the services processing logic has received the BT data packet.

In operation 312, the services processing logic (SPL) may determine whether the received data packet is a BT low energy (LE) packet based on information in the packet header. The services processing logic may determine a type (or property) of the received data packet.

If the determination is YES in operation 312, then the process may continue to operation 314. In operation 314, a determination is made regarding whether the request is from a legacy path application.

If the determination is NO in operation 314, then the process may continue to operation 316. In operation 316, the services processing logic may process the low energy (LE) SW stack along with the related LE profile.

In operation 318, if necessary, the services processing logic may wake up the host processor and deliver the result.

After operation 318, the process may continue to operation 308 where the services processing logic may wait for an incoming BT packet.

If the determination is NO in operation 312, then the process may continue to operation 324. In operation 324, the services processing logic may wake up the host processor, if needed.

In operation 326, the services processing logic (SPL) may send the data packet to a driver at the host processor. For example, the services processing logic (SPL) may send the BT data packet to a BT driver.

In operation 328, the host processor may process the BT data (from the data packet) and deliver the data to the related application.

In operation 330, the host processor may go to sleep.

After operation 330, the process may return to operation 308 where the services processing logic waits for an incoming BT packet.

Embodiments may allow sensor data processing/buffering, currently being done on wearable devices, to be offloaded onto electronic devices (i.e., smartphones) in the process reducing complexity of the wearable devices, extending their battery life and also promoting their adoption to other application domains.

In at least one embodiment, a computer-readable medium may store a program for controlling circuitry to perform operations of the above described services processing logic (SPL) (or first processor) and host processor. The circuitry may be controlled to control operations such as discussed above with respect to FIG. 6. The program may be stored in a system memory, which for example, may be internal or external to the electronic device 20. In at least one embodiment, the program may be part of a control algorithm for controlling operations of the electronic device 20.

Instructions or code executed by the processors may be provided to a memory from a machine-readable medium, or an external storage device accessible via a remote connection (e.g. over a network via an antenna and/or network interface) providing access to one or more electronically-accessible media, etc. A machine-readable medium may include any mechanism that provides (i.e., stores and/or transmits) information in a form readable by a machine (e.g., a computer). For example, a machine-readable medium may include random access memory (RAM), read only memory (ROM), magnetic or optical storage medium, flash memory devices, electrical, optical, acoustical or other form of propagated signals (e.g., carrier waves, infrared signals, digital signals), etc. In alternative embodiments, hard-wired circuitry may be used in place of or in combination with the instructions or code, and thus the embodiments are not limited to any specific combination of hardware circuitry and software instructions.

The program may include code or instructions to perform any of the operations or functions performed in embodiments previously discussed above.

Elements of the above described embodiments may be provided in code segments or instructions to perform tasks. The code segments or tasks may be stored in a processor readable medium or transmitted by a computing data signal in a carrier wave over a transmission medium or communication link. The processor readable medium, machine readable medium or computer readable medium may include any medium that can store or transfer information. Examples of the processor readable medium, machine readable medium or computer readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The data signal may include any signal that can propagate over a transmission medium such as electronic network channels, optical fibers, air, electromagnetic, RF links, etc. The code segments or instructions may be downloaded via computer networks such as the Internet, Intranet, etc.

The following examples pertain to further embodiments.

Example 1 is an electronic device comprising: a first processor; and a second processor, the first processor to wirelessly receive a data packet from another device, and to determine a type of the received data packet, and when the determined type of the received data packet is a first data packet type then the first processor to process the data packet, and when the determined type of the received data packet is a second data packet type then the first processor to provide the data packet to the second processor and the second processor to process the data packet.

In Example 2, the subject matter of Example 1 can optionally include that the first processor is a services processing logic.

In Example 3, the subject matter of Example 1 can optionally include that the second processor is a host processor.

In Example 4, the subject matter of Example 1 can optionally include that the data packet to include sensor data from the another device.

In Example 5, the subject matter of Example 1 can optionally include that when the determined type of the received data packet is the second data packet type, the first processor to wake up the second processor and to forward the data packet to the first processor.

In Example 6, the subject matter of Example 1 can optionally include that the first processor to determine the type of the received data packet based on a header of the data packet.

In Example 7, the subject matter of Example 1 can optionally include that the first processor and the second processor to be provided on a silicon chip.

In Example 8, the subject matter of Example 1 can optionally include that the first processor to include a first software stack, and the second processor to include a second software stack.

In Example 9, the subject matter of Example 1 and Example 8 can optionally include that the first software stack to include profile information related to the first data packet type, and the second software stack to include profile information related to the second data packet type.

Example 10 is an apparatus comprising: logic, at least a portion of which is hardware, to receive a data packet and to determine a type of the data packet, the logic to process the data packet by a first processor when the data packet is determined to be a first data packet type, and the logic to forward the data packet to a second processor when the data packet is determined to be a second data packet type, and the second processor to process the forwarded data packet.

In Example 11, the subject matter of Example 10 can optionally include that the first processor is a services processing logic.

In Example 12, the subject matter of Example 10 can optionally include that the second processor is a host processor.

In Example 13, the subject matter of Example 10 can optionally include that the data packet to include sensor data from an another device.

In Example 14, the subject matter of Example 10 can optionally include that when the determined type of the received data packet is the second data packet type, the first processor to wake up the second processor and to forward the data packet to the second processor.

In Example 15, the subject matter of Example 10 can optionally include that the first processor to determine the type based on a header of the data packet.

In Example 16, the subject matter of Example 10 can optionally include that the logic to be provided on a silicon chip.

In Example 17, the subject matter of Example 10 can optionally include that the first processor to include a first software stack, and the second processor to include a second software stack.

In Example 18, the subject matter of Example 10 and Example 17 can optionally include that the first software stack to include profile information related to the first data packet type, and the second software stack to include profile information related to the second data packet type.

Example 19 is a method of an electronic device, comprising: receiving a data packet at a first processor; determining a type of the received data packet; processing the data packet at the first processor when the received data packet is determined to be a first data packet type; providing the data packet to a second processor when the received data packet is determined to be a second data packet type; and processing the data packet at the second processor.

In Example 20, the subject matter of Example 19 can optionally include that the first processor is a services processing logic.

In Example 21, the subject matter of Example 19 can optionally include that the second processor is a host processor.

In Example 22, the subject matter of Example 19 can optionally include that the data packet to include sensor data from another device.

In Example 23, the subject matter of Example 19 can optionally include that providing the data packet to the second processor includes waking up the second processor and forwarding the data packet to the first processor.

In Example 24, the subject matter of Example 19 can optionally include that determining the type of the received data packet includes determining the type of the data packet based on a header of the data packet.

In Example 25, the subject matter of Example 19 can optionally include that the first processor and the second processor to be provided on a silicon chip.

In Example 26, the subject matter of Example 19 can optionally include that the first processor to include a first software stack, and the second processor to include a second software stack.

In Example 27, the subject matter of Example 19 and Example 26 can optionally include that the first software stack to include profile information related to the first data packet type, and the second software stack to include profile information related to the second data packet type.

Example 28 is a machine readable medium comprising one or more instructions that when executed cause a first processor and a second processor to perform one or more operations to: determine a type of a data packet received at the first processor; process the data packet at the first processor when the received data packet is determined to be a first data packet type; provide the data packet to a second processor when the received data packet is determined to be a second data packet type; and process the data packet at the second processor.

In Example 29, the subject matter of Example 28 can optionally include that the first processor is a services processing logic.

In Example 30, the subject matter of Example 28 can optionally include that the second processor is a host processor.

In Example 31, the subject matter of Example 28 can optionally include that the data packet to include sensor data from another device.

In Example 32, the subject matter of Example 28 can optionally include that providing the data packet to the second processor includes waking up the second processor and forwarding the data packet to the first processor.

In Example 33, the subject matter of Example 28 can optionally include that determining the type of the received data packet includes determining the type of the data packet based on a header of the data packet.

In Example 34, the subject matter of Example 28 can optionally include that the first processor and the second processor to be provided on a silicon chip.

In Example 35, the subject matter of Example 28 can optionally include that the first processor to include a first software stack, and the second processor to include a second software stack.

In Example 36, the subject matter of Example 28 and Example 35 can optionally include that the first software stack to include profile information related to the first data packet type, and the second software stack to include profile information related to the second data packet type.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
a first processor; and
a second processor, the first processor to wirelessly receive a data packet from another device, and to determine that a type of the received data packet is a Bluetooth™ low energy (BLE) or non-BLE data packet type based on a header of the received data packet, and when the determined type of the received data packet is the BLE data packet type then the first processor is to process the data packet, and when the determined type of the received data packet is the non-BLE data packet type then the first processor is to provide the data packet to the second processor and the second processor to process the data packet.

2. The electronic device of claim 1, wherein the header of the received data packet is a Host Controller Interface (HCI) header or Logical Link Control and Adaptation Protocol (L2CAP) header.

3. The electronic device of claim 1, wherein the second processor is a host processor.

4. The electronic device of claim 1, wherein when the determined type of the received data packet is the non-BLE data packet type, the first processor is to wake up the second processor and to forward the data packet to the first processor.

5. The electronic device of claim 1, wherein the received data packet is a Bluetooth™ (BT) data packet and the first processor is to determine the type of the received data packet based on a header of the BT data packet.

6. The electronic device of claim 1, wherein the first processor and the second processor are to be provided on a silicon chip.

7. The electronic device of claim 1, wherein the first processor is to include a first software stack, and the second processor is to include a second software stack.

8. The electronic device of claim 7, wherein the first software stack is to include profile information related to the BLE data packet type, and the second software stack is to include profile information related to the non-BLE data packet type.

9. One or more non-transitory computer-readable media (NTCRM) comprising one or more instructions that when executed cause a first processor and a second processor to perform one or more operations to:
determine a type of a data packet received to be a Bluetooth™ low energy (BLE) or non-BLE data packet type at the first processor;
process the data packet at the first processor when the received data packet is determined to be the BLE data packet type;
provide the data packet to a second processor when the received data packet is determined to be the non-BLE data packet type; and
process the data packet at the second processor.

10. The one or more NTCRM of claim 9, wherein providing the data packet to the second processor includes waking up the second processor and forwarding the data packet to the first processor.

11. The one or more NTCRM of claim 9, wherein determining the type of the received data packet includes determining the type of the data packet based on a header of the data packet.

12. The one or more NTCRM of claim 9, wherein the first processor and the second processor are to be provided on a silicon chip.

13. The one or more NTCRM of claim 9, wherein the first processor is to include a first software stack, and the second processor is to include a second software stack, the first software stack to include profile information related to the BLE data packet type, and the second software stack to include profile information related to the non-BLE data packet type.

* * * * *

UNITED STATES PATENT AND TRADEMARK OFFICE
CERTIFICATE OF CORRECTION

PATENT NO. : 10,721,684 B2
APPLICATION NO. : 15/037103
DATED : July 21, 2020
INVENTOR(S) : Uttam K. Sengupta et al.

Page 1 of 1

It is certified that error appears in the above-identified patent and that said Letters Patent is hereby corrected as shown below:

In the Claims

Column 10
Line 24, "... HC1" should read --... HCI--

Signed and Sealed this
Twenty-first Day of March, 2023

*Katherine Kelly Vidal*

Katherine Kelly Vidal
*Director of the United States Patent and Trademark Office*